Oct. 18, 1966
G. R. BLOUNT ET AL
3,279,070
AUTOMATIC GRADE LIGHT
Filed Sept. 10, 1964
3 Sheets-Sheet 1
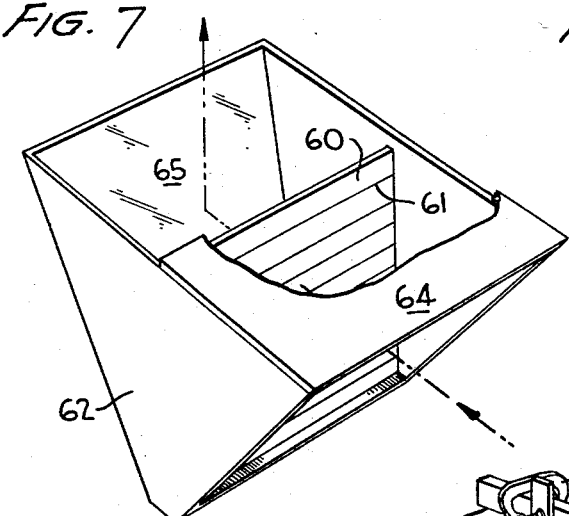
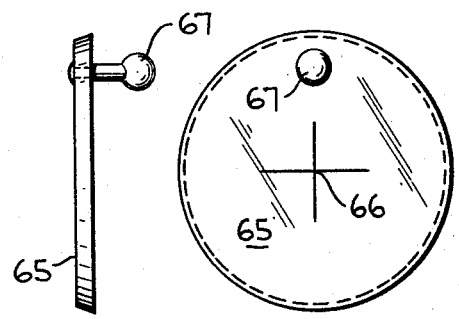
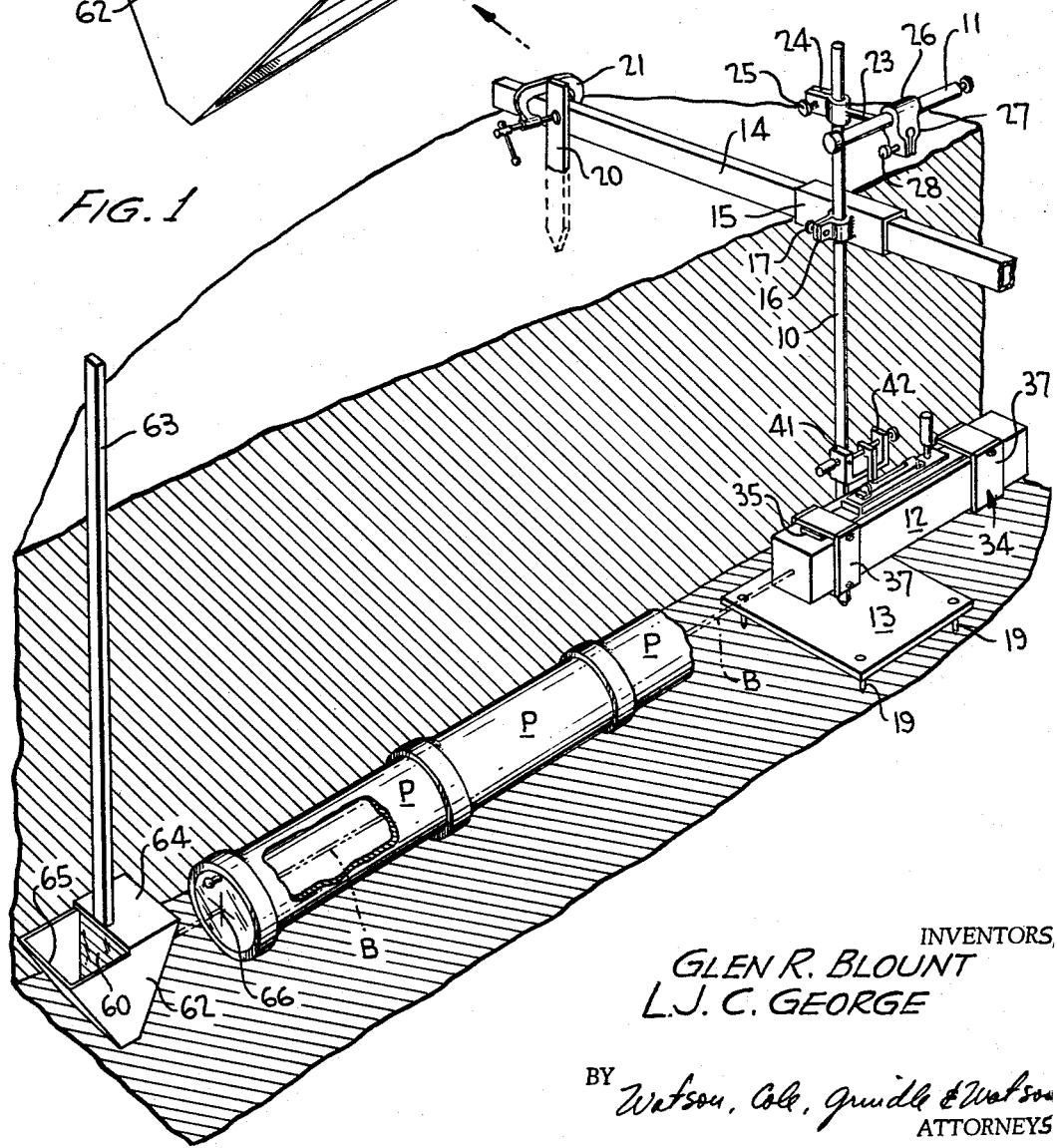
INVENTORS,
GLEN R. BLOUNT
L.J. C. GEORGE
BY *Watson, Cole, Grindle & Watson*
ATTORNEYS

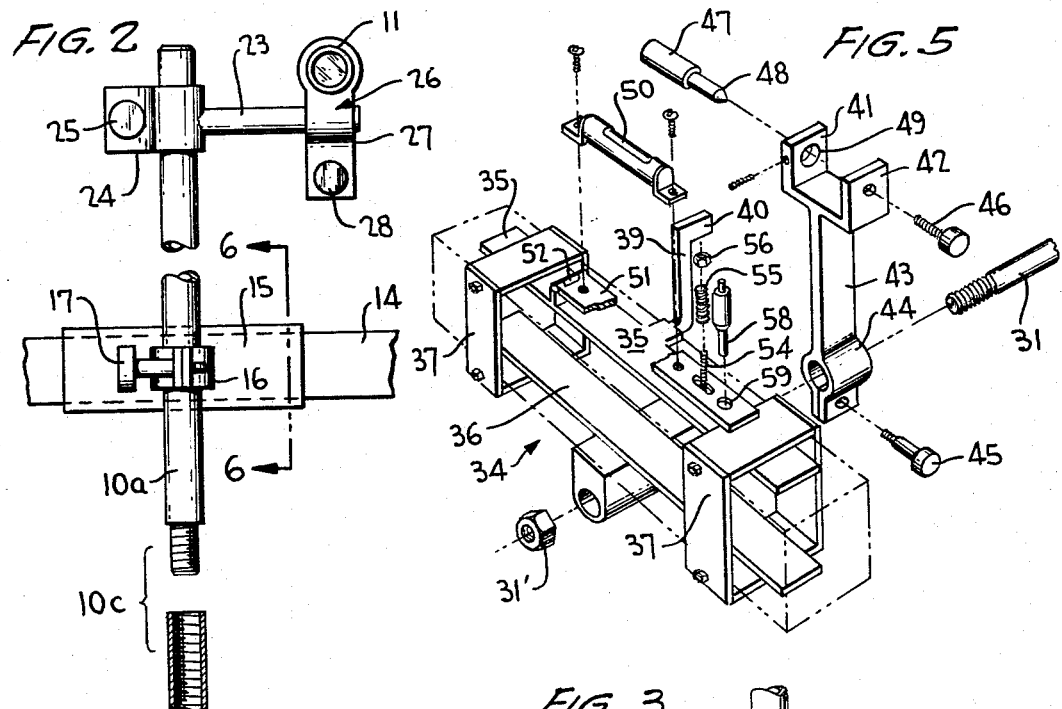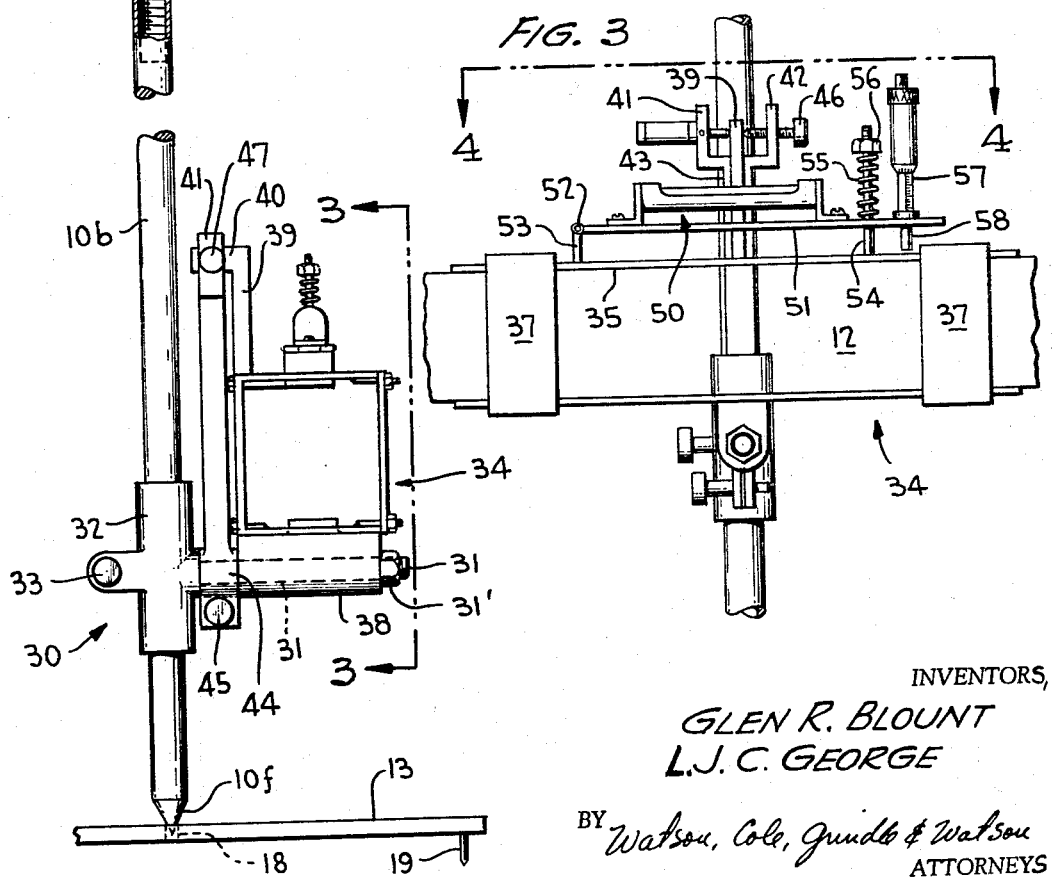

Oct. 18, 1966   G. R. BLOUNT ET AL   3,279,070
AUTOMATIC GRADE LIGHT
Filed Sept. 10, 1964   3 Sheets-Sheet 3

INVENTORS,
GLEN R. BLOUNT
L. J. C. GEORGE
BY Watson, Cole, Grindle & Watson
ATTORNEYS United States Patent Office 3,279,070
Patented Oct. 18, 1966

3,279,070
AUTOMATIC GRADE LIGHT
Glen R. Blount, 12 Dellwood Drive, and Lyndell J. C. George, 1709 Illinois St., both of Little Rock, Ark.
Filed Sept. 10, 1964, Ser. No. 395,395
7 Claims. (Cl. 33—46)

This invention relates to improvements in a grade light of the class in which a pencil or beam of light is projected at the desired lateral and vertical angles corresponding to the line and grade required for the work under construction, to serve as a visible, constant and extremely accurate reference line in connection with the work, without in any way interfering with the work.

It is a primary object of the invention to provide apparatus to facilitate accurate positioning of the light source or projector in inaccessible locations in such manner that its projected light beam may be readily adjusted from a remote position to the desired lateral angle, and also may readily be adjusted to any desired vertical angle or grade as well as to any of various heights within a given range. Thus the projected light beam reference line may be made to coincide with the axis of a line of pipe sections being laid along the bottom of a ditch, or may be made to closely parallel the upper surface of the ditch bottom along the center line of the ditch whereby to facilitate its rapid and accurate formation to the desired grade and in the desired direction.

It is a more specific object to provide such apparatus in a form especially adapted for use in laying pipe, although it is to be understood that the invention is by no means restricted to this particular use.

In carrying out the invention, the light source for projecting the light beam is carried adjacent the lower end of a vertically disposed rod in spaced relation to a suitable line-of-sight device secured to the rod at a conveniently accessible level. Means are provided for angularly adjusting both the light source and the line of sight device about the common axis provided by the rod to align both in a common plane parallel to the rod. Provision is made for supporting the rod for rotary adjustment about its vertical axis, with the common plane of the light beam and the line of sight device preferably offset therefrom, so that with said light source and line of sight device secured to the rod in their said positions of adjustment, angular adjustment of the line of sight device to accurately sight it in a given horizontal direction, will automatically align the projector and its light beam in the same direction. The projector will further be supported from the rod for adjustment of its vertical position thereon as well as of its vertical angle, whereby it may be positioned to have its projected beam coinciding with the desired center line of the pipes or other reference line that may be desired.

The light projecting device is bodily adjustable along the rod and also adjustable about a horizontal axis to any desired vertical angle or grade, and has suitable grade measuring and indicating means associated with it. In laying the pipe sections, the light beam normally is made to coincide with the axial center line along which the completed pipe is to extend, so as to be directed through the pipe sections and onto a suitable target positioned to intersect the light beam and thus provide easily visible and accurately determinable indication of its horizontal and vertical positions at any location along the ditch.

In conjunction with the target, there is employed a suitable center indicating and projecting device for removable reception in the end of a pipe section, to coact with the light beam in projecting an image of the center locating indicia onto the target in its relative position with respect to the point of intersection of the target by the center of the light beam. With this arrangement accurate aligning of each pipe section is readily attainable simply by adjusting the position of the pipe section to have its projected center images coincide on the target with the center of the spot of light caused by interception of the light beam by the target.

It is an important feature of the invention to utilize as the light projecting device, a laser which, as is generally recognized, is capable of projecting an intense beam of light consisting of light rays which are parallel and therefore non-divergent even though the beam is projected over quite long distances.

In the accompanying drawings, wherein is illustrated the preferred embodiment of the invention:

FIGURE 1 is a perspective view of apparatus in accordance with the invention illustrating its use in establishing line and grade, such as may be required for forming a trench for reception of a pipe line and also for positioning the pipe sections in alignment therein along said line and grade.

FIGURE 2 is an end elevation on a somewhat larger scale of the light projecting apparatus and its adjusting means, with certain parts shown fragmentarily.

FIGURE 3 is a fragmentary view through the light projecting device and its associated mounting and adjusting means, with certain parts shown fragmentarily.

FIGURE 5 is an exploded perspective view of the frame for supporting and adjusting the light projector.

FIGURE 7 is a perspective view of a target such as is particularly adapted for use in combination with the other components of the invention.

FIGURE 8 is a side elevation of the removable center indicating and projecting device for removable association with the pipe sections.

FIGURE 9 is a front elevation of the device of FIGURE 8, showing the center marking indicia thereon.

Figure 4:
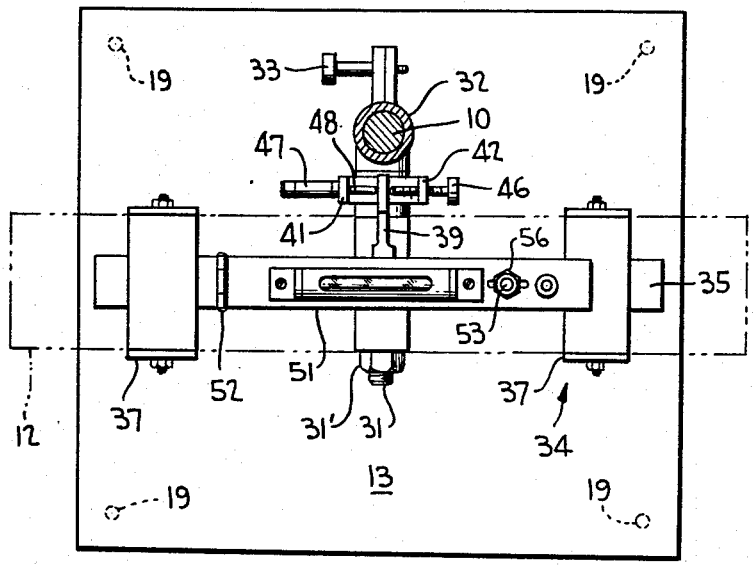
FIGURE 4 is a section on the line 4—4 of FIGURE 3.

To facilitate a rapid understanding of the invention, reference will now be made to the preferred embodiment thereof illustrated in the accompanying drawings, and specific language will be used to describe the same. It is nevertheless to be understood that no limitation of the scope of the invention is thereby intended, but that such further modifications and alterations are contemplated as would normally occur to persons of average skill in the art to which the invention relates.

Referring now in detail to the drawings, and first considering the general organization of elements as disclosed in FIGURE 1, the numeral 10 therein designates a rectilinear rod of circular cross-section which serves as a means for supporting and interconnecting the line-of-sight device 11, the light beam projecting device 12 and their associated adjusting mechanisms.

Preferably the rod 10 comprises separable upper and lower sections releasably interconnected by suitable means such as the threaded coupling 10c shown in FIGURE 2.

For accurately vertically positioning the rod 10 in a ditch, in the manner shown in FIGURE 1, for rotary adjustment about its vertical axis, there are provided means such as the base plate 13, in conjunction with the horizontal cross bar 14 supported across the upper edges of the ditch, and on which is disposed a laterally adjustable slide 15. Affixed to this slide is a clamp 16 of the split ring type having an adjusting screw 17.

The base plate 13 is shown simply as a flat metal plate having a centering bore or indentation 18, best seen in FIGURE 2, for accurately locating and rotatably journalling the conically pointed lower end 10f of rod 10. At its corners, the plate 13 is provided with downwardly projecting spikes 19 for substantially levelling the plate 13 and maintaining it in fixed position on the bottom of the ditch.

Cross bar 14 is adapted to span the ditch transversely and to be supported in a horizontal plane by suitable supports, exemplified by vertical stakes 20 driven into the ground on opposite sides of the ditch. The opposite end portions of the cross bar are connected to the respective stakes by C-clamps or other readily detachable and adjustable means 21, as shown in FIGURE 1.

Figure 6:
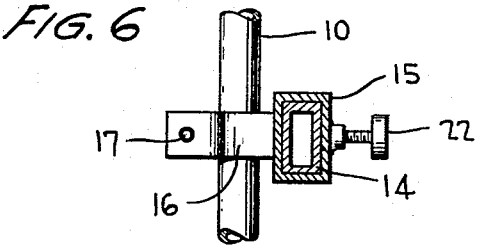
FIGURE 6 is a detail section on the line 6—6 of FIGURE 2.

Slide 15 is illustrated as a tubular sleeve of a rectangular cross section slidably supported for movement along the similarly shaped cross bar. For securing the slide in adjusted position on the cross bar, there is provided a set screw 22 as shown in FIGURE 6.

A clamp 16 of the split ring type is affixed to the slide and may have its adjusting screw 17 loosened to permit rotary adjustment of the rod to the desired position, following which it will be tightened to maintain such position. The vertical axis about which the rod 10 is thus adjusted, will be seen to be accurately located by the joint action of the vertically aligned rod clamp 16 and the centering bore 18 in base plate 13.

The line-of-sight device 11 illustrated in the drawings, is exemplified by a conventional cross-hair equipped telescope. For adjustably supporting this telescope from rod 10, there is provided a horizontal supporting arm 23 which is affixed to the rod 10 by a clamp 24. By suitable adjustment of its adjusting screw 25, clamp 24 may be sufficiently loosened to provide a journal by which the arm 23 is supported for rotary adjustment as well as for axial adjustment on the rod 10. The telescope 11 itself is supported on the arm 23 for angular adjustment about the axis thereof as well as for bodily horizontal adjustment along arm 23 toward and away from rod 10. To this end, the telescope 11 is supported by a bracket 26 which incorporates in its structure a ring clamp 27 adapted to be tightened or loosened about arm 23 through actuation of its conventional adjusting screw 28.

For supporting the light beam projector 12, there is provided a bracket, generally designated 30, and including a horizontal supporting arm 31 of cylindrical shape. This arm is affixed to the rod 10 by the elongated sleeve-like clamping member or clamp 32, having an adjusting screw 33 which may be loosened so that the split ring clamp 32 may act as a bearing to permit swinging adjustment of arm 31 about the rod 10, as well as vertical adjustment along the rod.

The light beam projector 12 is supported for angular adjustment on the arm 31 by means comprising a mounting bracket 34 of any appropriate structure. In the present embodiment, the projector 12 is of the laser type, and is confined securely within the enclosing bracket 34 with its longitudinally opposed ends projecting from the bracket to project a light beam coincident with the longitudinal axis of the projector. In the form illustrated, bracket 34 comprises relatively spaced parallel upper and lower rigid metal plates 35 and 36 respectively interconnected by encircling bands such as 37 disposed at spaced intervals.

A bearing sleeve 38 affixed to the lower plate 36 of the bracket is rotatably journalled on the cylindrical arm 31 to cooperate with the arm in defining a horizontal pivotal axis about which the bracket 34 and projector 12 may be angularly adjusted to any preselected vertical angle or grade setting. The projected light beam, being coincident with the longitudinal axis of the projector, will be projected at the identical preselected vertical angle.

For accurately adjusting the projector 12 to the desired grade, there is provided a generally conventional tangent screw assembly similar to those customarily employed on engineer's transits. This assembly comprises an adjusting arm 39 which, as shown in FIGURES 2 and 5, is rigidly connected to the projector bracket 30 and extends therefrom radially to the shaft 31 to transmit the desired adjustment to the bracket 34 and projector 12.

A laterally projecting lug 40 at the free end of arm 39 is received between relatively spaced vertical end members of a U-shaped yoke, such members being designated 40 and 41 respectively. The yoke is supported at the upper end of a post 43 which normally is rigidly affixed to the arm 31 by means of a split clamp 44 at its lower end, having a tightening screw 45.

Horizontally threaded through one of the yoke members or portions 42, is the tangent screw 46 in endwise abutment with the lug 40 of arm 39. Rotation of the tangent screw manifestly will result in angular adjustment of the arm 39 and light projector 12. In order to cause the arm 39 to move with the tangent screw in either direction of angular movement, there is carried by the other yoke member 41 a spring housing 47, from one end of which is spring projected the plunger 48 for movement through a hole 49 in member 41 in abutting engagement with lug 40 in opposition to the thrust of screw 46.

In order to facilitate accurate setting of the projector 12 at any desired vertical angle or grade about the axis of arm 31, there is included a grade setting and indicating mechanism. Such mechanism consists of a spirit level 50 supported on a base plate 51 to indicate when the latter is accurately positioned in a horizontal plane. Base plate 51 is spaced somewhat above the upper bracket plate 35 of bracket 34 with one end pivotally connected to the plate at 52 through upright stud 53. By adjusting the spirit level 50 and its base plate 51 into an angular relationship with the bracket 34 and projector 12 corresponding to the desired grade setting of the projector, and then angularly adjusting the projector 12 and its bracket 34 to return the spirit level to a truly horizontal position, it will be apparent that projector 12 will be adjusted accurately to its intended vertical angle or grade.

With this in mind, a threaded stud 54 affixed normally to the upper surface of the plate 35 of the projector bracket is freely movable through an opening in base plate 51 of the level, and a spring 55 guided on the stud is adjustably compressed between the plate 51 and a nut 56 threaded onto the upper end of stud 54. Angular adjustment of the spirit level and its base plate 51 with respect to the projector 12 and projector bracket 34, is produced jointly by the pressure of spring 55 in conjunction with a micrometer 57 affixed to the base plate 51, with the micrometer spindle 58 movable through an opening 59 (FIG. 5), into thrusting engagement with plate 35 of bracket 34.

For use with the apparatus above described, there is employed in combination therewith, a center indicating and projecting device 65, illustrated in detail in FIGURES 8 and 9, for removable disposition in the pipe sections, to coact with the light beam B in projecting onto a suitable target 62 (FIGURES 1 and 7) an image of the center marking or indicia as well as a brilliantly lighted spot where the light beam proper intersects the target. Thus the relative positions of the pipe section center line at one end of the pipe section, and of the reference line will be clearly shown on the target, so that the direction and amount of movement of the pipe section end portion needed to cause said center line and the reference line to coincide, in order to align the pipe section, will be indicated on the target at all times, and in such manner that the indication will not be discontinued or obscured during the normal course of shifting the pipe section into alignment.

The target 60 preferably comprises a translucent plate 60 of glass, plastic or the like, which may advantageously be provided with opaque, uniformly spaced horizontal reference lines 61, to measure the distance required for vertical adjustment of the pipe end to bring its center to the level of the projected light beam center line. Preferably target 60 is supported in a housing 62 carried at the lower end of a vertical supporting handle 63 so that it may be conveniently positioned at the bottom of the ditch in a substantially vertical plane transversely of the ditch, and located to intercept the light beam B in its central portion after same has passed through the pipe sections already aligned and in process of alignment in the ditch.

A hood 64, constituting part of the housing 62 overhangs the target in a direction toward the light beam projector 12 to shade the target and thereby enhance the visibility of the light spot and the projected center image thereon.

Rearwardly of the target 60, the housing 62 is formed to provide a reflector or mirror surface 65 inclined at an angle of about 45 degrees to the vertical target 60 so that the images of the light beam B and the center indicia 66 of the device 65, together with the horizontal reference lines 61 of the target, will be reflected upwardly in a generally vertical direction for ready visibility and interpretation by a workman viewing the target from above, via the mirror surface 65.

The pipe center indicating device 65 preferably comprises a disc of transparent material having its external diameter proportioned for snug removable disposition in the ends of the respective pipe sections P. The center markings or indicia of the disc are in the form of opaque horizontal and vertical cross lines whose intersection 66 designates the center of the disc. A manipulating knob or handle 67 affixed to the disc facilitates the withdrawing of the disc from the respective pipe sections for reuse.

In the use of the invention, the cross bar or beam 14 is first positioned horizontally across the trench by stakes 20 and clamps 21, and the slide 15 is adjusted and fixed thereon in a position in which a vertical line disposed coaxially through the center of its clamping ring 16 intersects, the desired center line for the pipe.

Base plate 13 is then positioned with its bore 18 in accurate vertical registry with the center of clamping ring 16. A plumb bob suspended coaxially through the ring clamp 16 may be employed to advantage in the foregoing operations, it being understood that the rod 10 will not yet have been positioned within the ring clamp 16.

The upper section of rod 10 will then be inserted downwardly through the loosened clamp 16. The lower section of rod 10, with the projector bracket 34 and projector 12 in place thereon, is then coupled (via the threaded coupling 10c) to the upper section and the pointed lower end of the rod 10 is then inserted into the bore 18 in plate 13 where it is centered and rotatably journaled for rotary adjustment so long as the clamp 16 is sufficiently loose to permit such adjustment.

Clamping sleeve 32 is loosened to permit adjustment of the light beam projector 12, and its associated holding bracket 30 to the desired vertical location on rod 10 at the level of the desired center line of the pipe. With the projector located at the desired height, the clamping sleeve 32 is tightened to securely maintain such adjustment.

The line of sight of the telescope 11 is now made to parallel the light beam. This may be conveniently achieved by placing the target 60 at a location in which it may be brought within the path of both the projected light beam B of the light projector 12 and the line of sight through the telescope 11. By appropriate rotary movement of the rod 10, the light projector 12 is angularly adjusted in a horizontal plane until its projected light beam intersects the target 60, as indicated by the projection onto the target of a spot of light at the point of such intersection. Telescope 11 is then adjusted to cause its vertical cross hair to bisect the spot of light.

With the ring clamp 16 for the rod loosened, and with the telescope affixed to the rod in its aforesaid position of adjustment, as by tightening of its clamp 24, the telescope 11 is then sighted on a target which is accurately positioned at a remote point along the vertical plane of the desired center line of the pipe, thereby acting through the rod 10 to also project the light beam B from projector 12 along such center line. Clamp 16 is then tightened to secure the rod 10 and projector 12 fixedly in this adjusted position.

The desired vertical angle or grade of the pipe center line is then set on the micrometer 57, which preferably is calibrated in terms of grade. Clamp 44 is then loosened while the projector bracket 34 and projector 12 are angularly adjusted about the arm or pintle 31 until the bubble in spirit level 50 is approximately centered. Then clamp 44 is tightened and the final exact adjustments are made by manipulation of the tangent screw 46.

The light beam B now coincides with the intended pipe center line. Throughout the continuance of the trenching operation, the ditch target 60 may be advantageously employed to gage and to check the trench alignment and depth. As the trench progresses along the center line, the pipe laying crew follows, and the pipe center indicating and projecting device 65, is employed in conjunction with the target 60 to accurately position the respective pipe sections in alignment with their axes coincident to the projected light beam B.

In addition to an improved apparatus, as above described, it will be apparent that the invention also includes the new and useful method of aligning pipe as above described.

In the present application we have shown and described only the preferred embodiment of our invention, simply by way of disclosing the preferred mode contemplated by us of practicing the invention. However, it will be understood that the invention is capable of other and different embodiments, and that its several details are capable of modification in various ways, all without departing from the invention. Accordingly, the foregoing drawings and description are to be understood as merely illustrative in nature, and not as restrictive.

Having thus described our invention, we claim:

1. Apparatus for projecting and utilizing a light beam as a reference line for construction purposes comprising a rectilinear rod and means supporting said rod for rotation about its major rectilinear axis, a line-of-sight sighting device and a light beam projecting device both affixed to said rod and spaced apart thereon in a direction parallel to the said axis, said devices being oriented relative to the said axis with the line of sight of said line-of-sight device and with the center line of the light beam from said projecting device both directed generally transversely to said axis and in a common plane parallel to said axis, whereby rotary adjustment of the rod about said axis to bring the line-of-sight device into alignment with a predetermined point, will similarly cause the projected beam of light from said projecting device to be positioned with its center line in a plane common to said point and to the line of sight of said line-of-sight device, and means for angularly adjusting said devices relative to each other in a plane parallel to said axis.

2. Apparatus as defined in claim 1 in which the common plane containing the line of sight of said line-of-sight device and said projected light beam center line is offset laterally to one side of the rod.

3. Apparatus as defined in claim 1, in which said light beam projecting device is of the type adapted to form an intense, substantially non-divergent pencil of light.

4. Apparatus as defined in claim 2 for use in laying and aligning pipes to predetermined grades, further comprising a target spaced from said rod in position to intercept said light beam to provide a visual indication of the point at which said target is intercepted by the light beam, and a pipe center indicator disc adapted for removable concentric association with a pipe through which the light beam is projected, said disc bearing a center indicating means for projection by the light beam onto the target, whereby adjustment of the pipe to cause said projected center indicating means on the target to coincide with the center of the light spot produced on the target by said projected light beam will position said pipe with its axis coinciding with the center line of the light beam at the location of said center indicating means along the pipe.

5. Apparatus as defined in claim 4 in which said indicator disc being a transparent disc having opaque lines thereon at right angles to each other and intersecting at the center of the disc, said disc being concentriclly disposed and supported within the end portion of a pipe section to be aligned.

6. Apparatus as defined in claim 4 in which said target includes a housing and means for positioning and supporting said target in a plane normal to said projected light beam, said target being translucent, and a reflecting surface carried by said housing rearwardly of the target and at an upwardly diverging angle thereto, whereby to reflect upwardly for ready visibility the relative positions of the light spot made by the projected light beam and the image of the center marking.

7. Apparatus as defined in claim 6, in which said target is provided with opaque reference lines adapted for reflection from said mirror surface together with said light spot and said image of the center marking.

References Cited by the Examiner

UNITED STATES PATENTS

| | | | |
|---|---|---|---|
| 1,130,926 | 3/1915 | Peck | 33—1 |
| 1,609,912 | 12/1926 | Mazeau | 33—1 |
| 2,198,836 | 3/1940 | Patton | 33—46.2 |
| 3,116,557 | 1/1964 | Trice | 33—46 |

FOREIGN PATENTS 947,568  1/1964  Great Britain.

LEONARD FORMAN, *Primary Examiner.*

W. D. MARTIN, *Assistant Examiner.*